(12) United States Patent
Barr et al.

(10) Patent No.: US 11,577,583 B2
(45) Date of Patent: Feb. 14, 2023

(54) PIVOTING CURSOR FOR FRAMELESS GLASS IN A VEHICLE

(71) Applicant: Inteva Products, LLC, Troy, MI (US)

(72) Inventors: Geoffrey Barr, Troy, MI (US); Bruce Rokicki, Rochester Hills, MI (US); Sadmira Beganovic, Macomb Township, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 280 days.

(21) Appl. No.: 16/859,390

(22) Filed: Apr. 27, 2020

(65) Prior Publication Data

US 2020/0338965 A1    Oct. 29, 2020

Related U.S. Application Data

(60) Provisional application No. 62/839,250, filed on Apr. 26, 2019.

(51) Int. Cl.
| | | |
|---|---|---|
| *B60J 1/16* | (2006.01) | |
| *B60J 1/00* | (2006.01) | |
| *B60J 1/17* | (2006.01) | |
| *E05D 15/16* | (2006.01) | |

(52) U.S. Cl.
CPC .............. *B60J 1/006* (2013.01); *B60J 1/17* (2013.01); *E05D 15/165* (2013.01); *E05Y 2201/684* (2013.01); *E05Y 2201/708* (2013.01); *E05Y 2900/55* (2013.01)

(58) Field of Classification Search
CPC .......... B60J 1/006; B60J 1/17; E05D 15/165; E05D 15/689; E05Y 2201/684; E05Y 2201/708; E05Y 2900/55; E05F 11/385

USPC ........................................................... 49/375
See application file for complete search history.

(56) References Cited

U.S. PATENT DOCUMENTS

| | | | | |
|---|---|---|---|---|
| 4,051,632 A | | 10/1977 | Fukumoto et al. | |
| 4,586,290 A | | 5/1986 | Juechter | |
| 4,956,942 A | | 9/1990 | Lisak et al. | |
| 5,363,595 A | * | 11/1994 | Wirsing .............. | E05F 11/385 |
| | | | | 52/204.597 |
| 5,729,930 A | * | 3/1998 | Schust ..................... | B60J 1/17 |
| | | | | 49/375 |
| 5,987,820 A | * | 11/1999 | Shibanushi .......... | E05F 11/385 |
| | | | | 49/358 |
| 6,453,617 B1 | * | 9/2002 | Klippert ............... | E05F 11/385 |
| | | | | 49/375 |

(Continued)

FOREIGN PATENT DOCUMENTS

| | | |
|---|---|---|
| DE | 10331001 A1 | 4/2004 |
| WO | 2007096540 A1 | 8/2007 |

OTHER PUBLICATIONS

International Search Report for Application No. PCT/US2020/030076.

(Continued)

*Primary Examiner* — Jerry E Redman
(74) *Attorney, Agent, or Firm* — Cantor Colburn LLP

(57) ABSTRACT

A pivoting cursor for a frameless window. A pivoting cursor for a frameless window of a vehicle door, including: a main body portion; a pivoting plate pivotally secured to the main body portion for pivotal movement about an axis; a clamping plate; a seal; and a threaded adjuster for pivoting the pivoting plate with respect to the main body portion.

20 Claims, 14 Drawing Sheets

(56) References Cited

U.S. PATENT DOCUMENTS

| | | | | |
|---|---|---|---|---|
| 6,854,213 B2* | 2/2005 | Galliani | ............... | B60J 1/17 |
| | | | | 49/374 |
| 8,096,080 B2* | 1/2012 | Pavlovic | ............ | E05F 11/488 |
| | | | | 49/374 |
| 10,273,733 B2* | 4/2019 | Huang | ............... | B60J 1/17 |
| 11,162,291 B2* | 11/2021 | Reames | ............ | E05F 11/488 |
| 11,168,501 B2* | 11/2021 | Pavlovic | ............ | E05D 15/165 |
| 2004/0088924 A1* | 5/2004 | Moser | ............ | E05F 11/385 |
| | | | | 49/375 |
| 2007/0022665 A1* | 2/2007 | Bigourden | ............ | E05F 11/385 |
| | | | | 49/375 |
| 2009/0007494 A1* | 1/2009 | Pavlovic | ............ | E05F 11/488 |
| | | | | 49/348 |
| 2010/0043297 A1* | 2/2010 | Barr | ............ | E05F 11/385 |
| | | | | 24/458 |
| 2018/0326820 A1* | 11/2018 | Huang | ............ | E05F 11/385 |
| 2020/0173212 A1* | 6/2020 | Pavlovic | ............ | E05F 11/385 |
| 2020/0386026 A1* | 12/2020 | Reames | ............ | E05F 11/385 |

OTHER PUBLICATIONS

Written Opinion for Application No. PCT/US2020/030076.
Extended European Search Report; dated Dec. 8, 2022; EP Application No. 20794540.3, Filed Apr. 27, 2020, 7 pages.

* cited by examiner

PIVOTING CURSOR FOR FRAMELESS GLASS IN A VEHICLE

CROSS REFERENCE TO RELATED APPLICATIONS

This application claims priority to the following U.S. Provisional Patent Application, Ser. No. 62/839,250 filed on Apr. 26, 2019 the contents of which are incorporated herein by reference thereto.

BACKGROUND

Exemplary embodiments of the present disclosure pertain to the art of vehicle windows and in particular frameless window systems.

Frameless window systems are adjusted for glass sealing in the Y direction by adjusting the regulator rails by means of slotted brackets or Jack screws.

However, this method can limit the stiffness of the system, is costly in tools and components, and can adversely affect the glass system deflection. In addition and when the adjustment is performed on the rail, additional clearances are needed in the door for rail packaging.

BRIEF DESCRIPTION

Disclosed is a pivoting cursor for a frameless window.

Also disclosed is a pivoting cursor for a frameless window of a vehicle door, including: a main body portion; a pivoting plate pivotally secured to the main body portion for pivotal movement about an axis; a clamping plate; a seal; and a threaded adjuster for pivoting the pivoting plate with respect to the main body portion.

In addition to one or more of the features described above, or as an alternative to any of the foregoing embodiments, the pivoting plate is rotationally mounted to a shaft that is secured to the main body portion.

In addition to one or more of the features described above, or as an alternative to any of the foregoing embodiments, the threaded adjuster includes a nut and a threaded fastener.

In addition to one or more of the features described above, or as an alternative to any of the foregoing embodiments, the threaded fastener threadingly engages the nut and a threaded opening of the pivoting plate.

In addition to one or more of the features described above, or as an alternative to any of the foregoing embodiments, the threaded fastener does not threadingly engage an opening the clamping plate.

In addition to one or more of the features described above, or as an alternative to any of the foregoing embodiments, the threaded fastener includes a flange portion located between the main body portion and the clamping plate.

In addition to one or more of the features described above, or as an alternative to any of the foregoing embodiments, threads of the nut and the threaded opening are configured such that rotation of the threaded fastener therein will cause the pivoting plate to pivot about the axis and cause a portion of the pivoting plate secured to the threaded fastener to move in a direction away from a portion of the main body portion proximate to the threaded fastener, which will also cause movement of the clamping plate, the seal and a window that is received within the seal.

In addition to one or more of the features described above, or as an alternative to any of the foregoing embodiments, a pair of sliders are secured to the main body portion.

In addition to one or more of the features described above, or as an alternative to any of the foregoing embodiments, the pair of sliders are formed a different material than that of the main body portion.

Also disclosed is a door module, including: a window regulator secured to an inner door panel of the door module, the window regulator including a pair of guide rails fixedly secured to the inner door panel of the door module; and a pivoting cursor for slidably engaging one of the pair of guide rails, the pivoting cursor comprising: a main body portion; a pivoting plate pivotally secured to the main body portion for pivotal movement about an axis; a clamping plate; a seal; and a threaded adjuster for pivoting the pivoting plate with respect to the main body portion.

In addition to one or more of the features described above, or as an alternative to any of the foregoing embodiments, the pivoting plate is rotationally mounted to a shaft that is secured to the main body portion.

In addition to one or more of the features described above, or as an alternative to any of the foregoing embodiments, the threaded adjuster includes a nut and a threaded fastener.

In addition to one or more of the features described above, or as an alternative to any of the foregoing embodiments, the threaded fastener threadingly engages the nut and a threaded opening of the pivoting plate.

In addition to one or more of the features described above, or as an alternative to any of the foregoing embodiments, the threaded fastener does not threadingly engage an opening the clamping plate.

In addition to one or more of the features described above, or as an alternative to any of the foregoing embodiments, the pivoting cursor further includes a pair of sliders secured to the main body portion, the pair of sliders being configured to slidably engage one of the pair of guide rails.

In addition to one or more of the features described above, or as an alternative to any of the foregoing embodiments, the door module is a front door module and a frameless window is secured to the pivoting cursor.

In addition to one or more of the features described above, or as an alternative to any of the foregoing embodiments, the door module is a rear door module and a frameless window is secured to the pivoting cursor.

In addition to one or more of the features described above, or as an alternative to any of the foregoing embodiments, the pivoting cursor is a pair of pivoting cursors each one of the pair of pivoting cursors being slidably secured to a respective one of the pair of guide rails.

In addition to one or more of the features described above, or as an alternative to any of the foregoing embodiments, threads of the nut and the threaded opening are configured such that rotation of the threaded fastener therein will cause the pivoting plate to pivot about the axis and cause a portion of the pivoting plate secured to the threaded fastener to move in a direction away from a portion of the main body portion proximate to the threaded fastener, which will also cause movement of the clamping plate, the seal and the frameless window that is received within seal.

Also disclosed is a method of mounting a frameless window of a vehicle to a door module, including: securing a portion of the frameless window to a pivoting cursor slidably engaging one of a pair of guide rails of a window regulator secured to the door module; and adjusting a location of the frameless window by pivoting a pivoting plate of the pivoting cursor with respect to a main body portion of the pivoting cursor, the pivoting cursor further comprising a threaded adjuster for pivoting the pivoting plate with respect to the main body portion.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
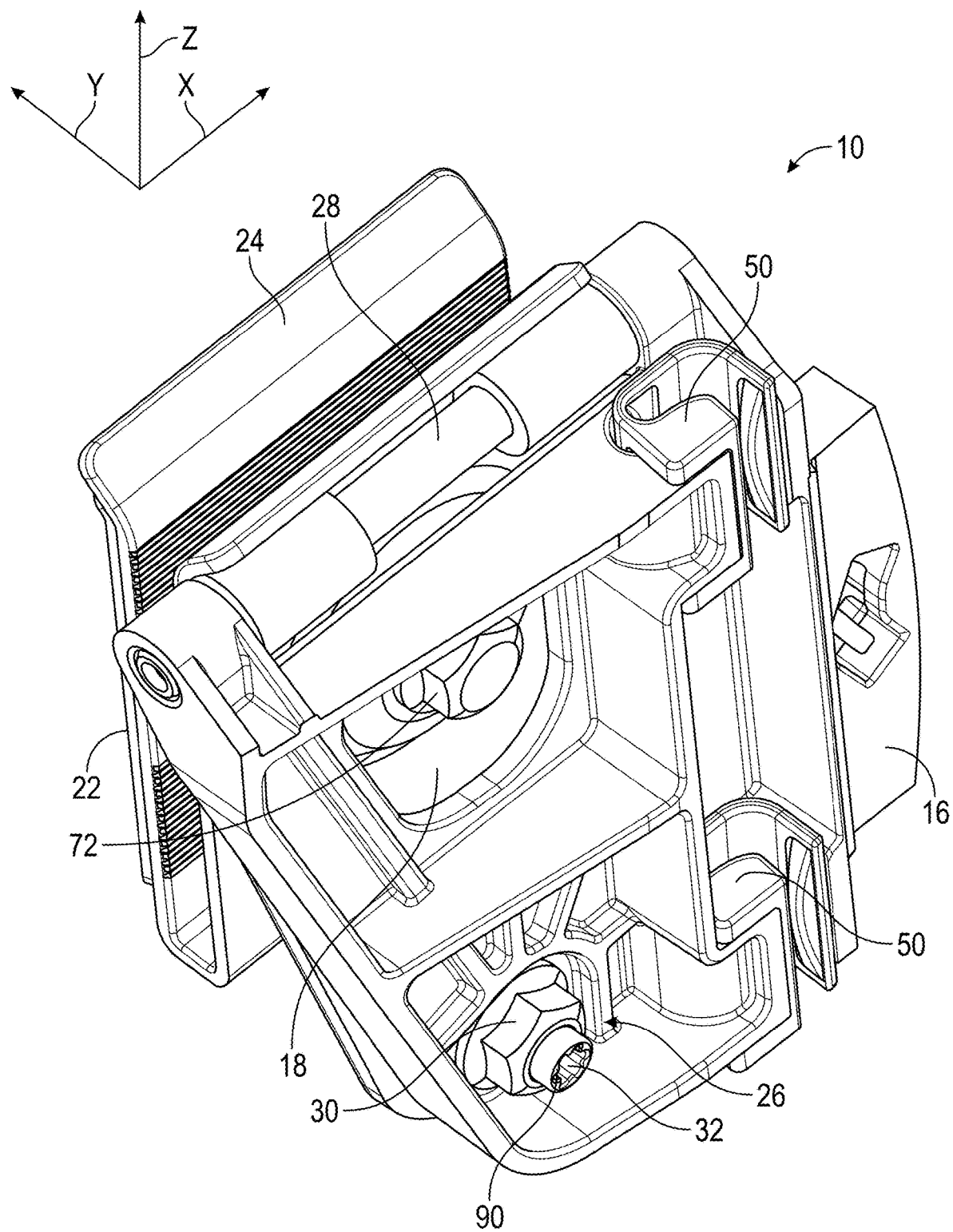
FIG. 1 is perspective view of the pivoting cursor in accordance with the present disclosure.
Figure 2:
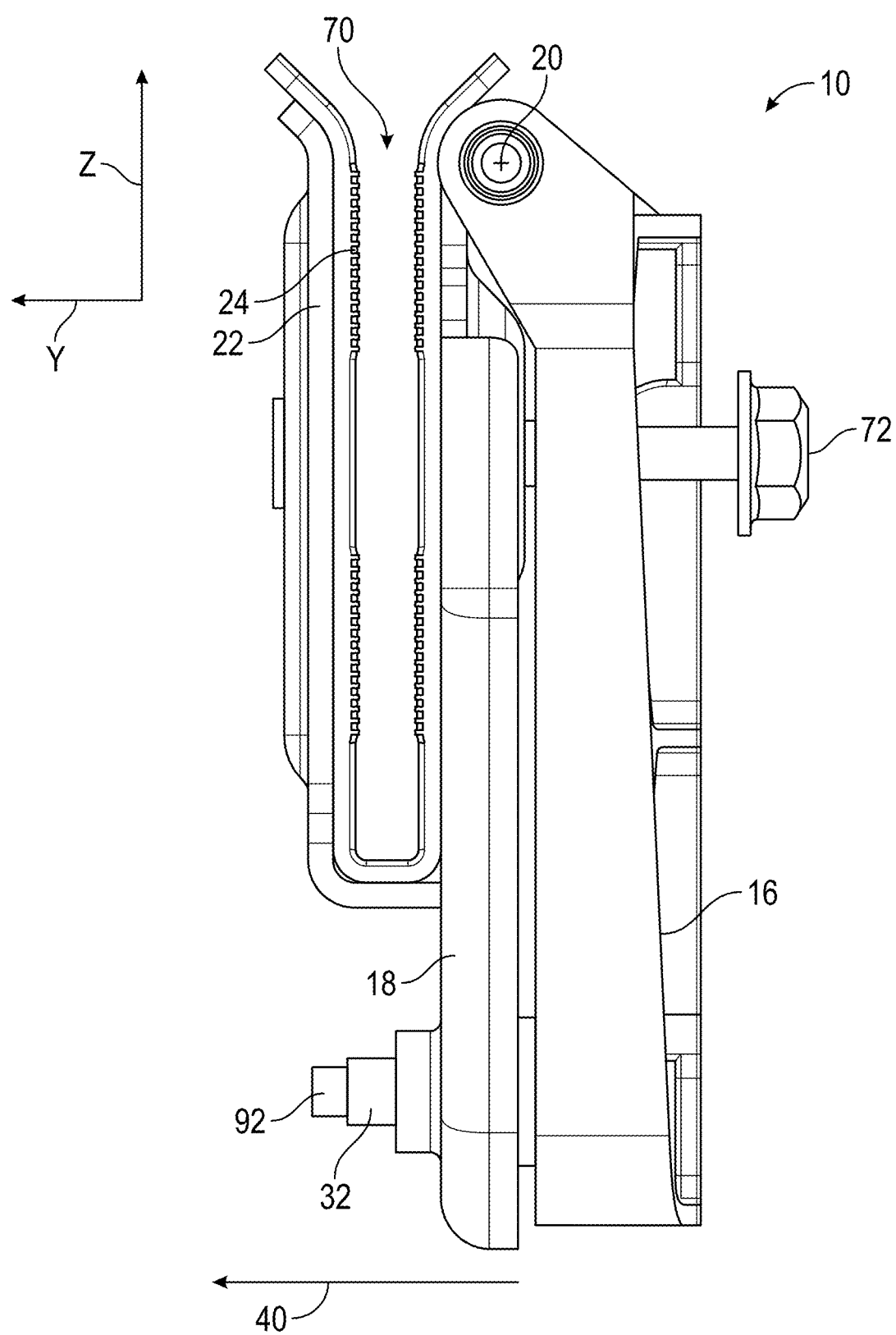
FIG. 2 is a side view of the pivoting cursor in accordance with the present disclosure.
Figure 3:
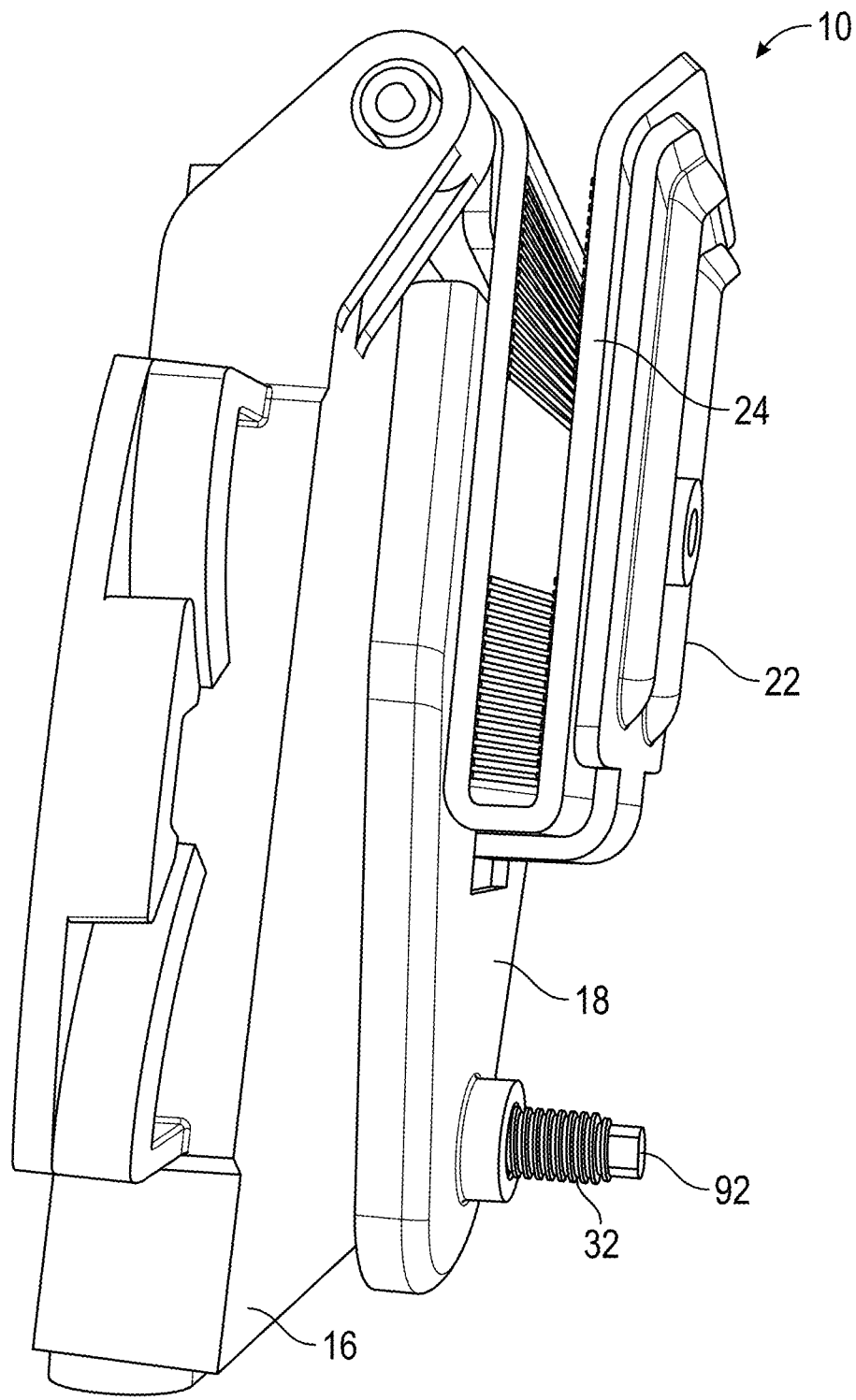
FIGS. 3-5 are additional views of the pivoting cursor in accordance with the present disclosure.
Figure 4:
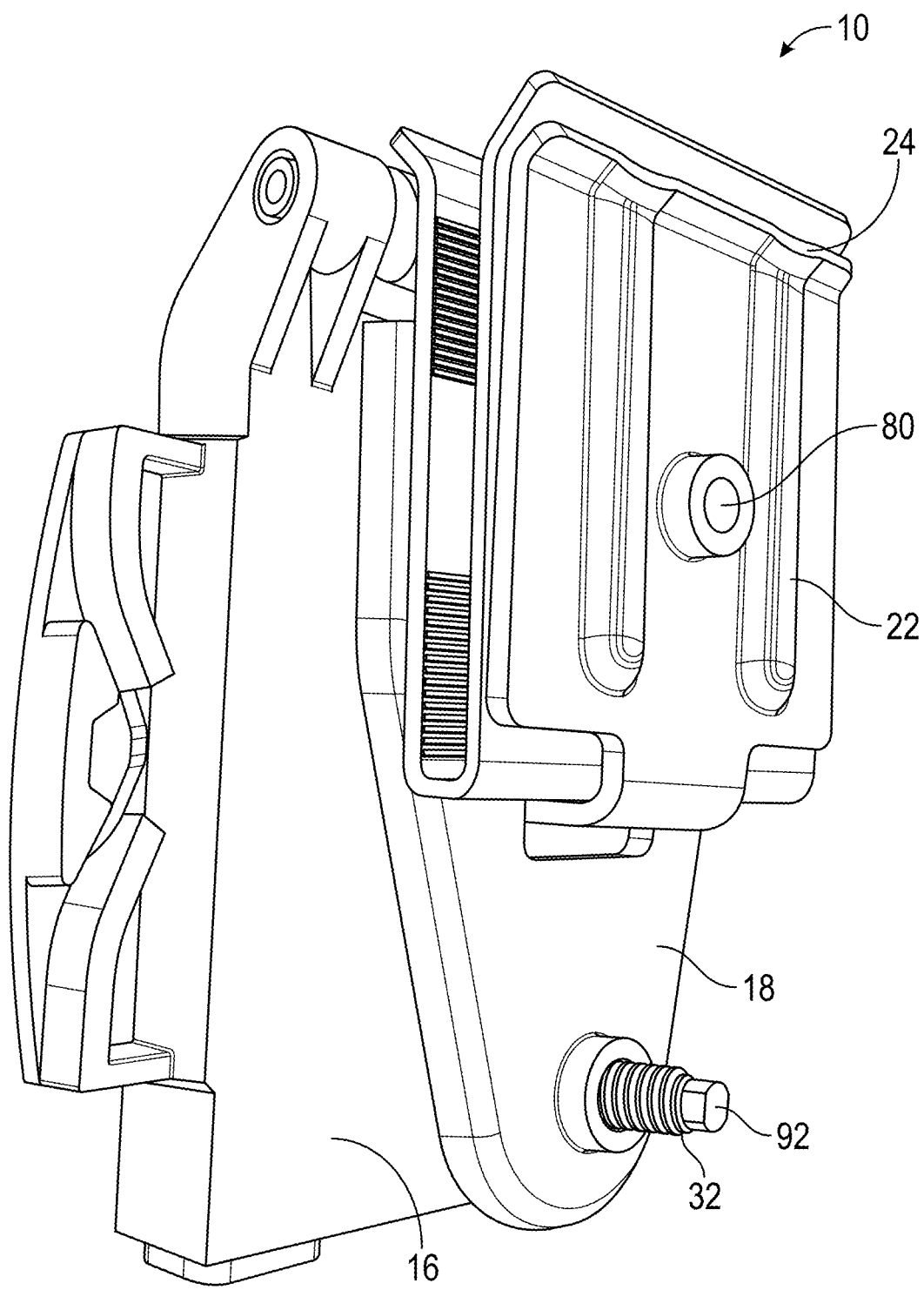
Figure 5:
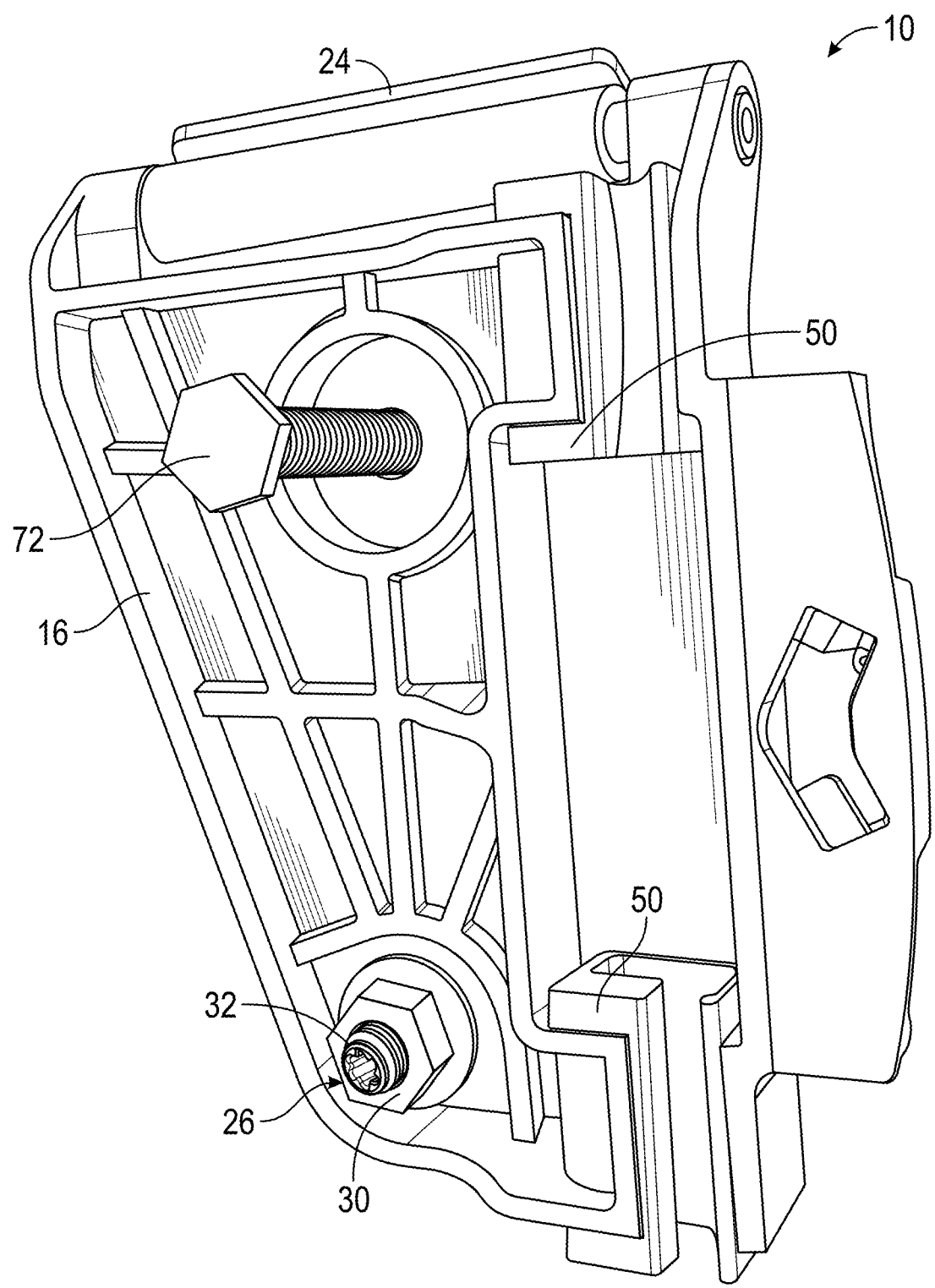
Figure 6:
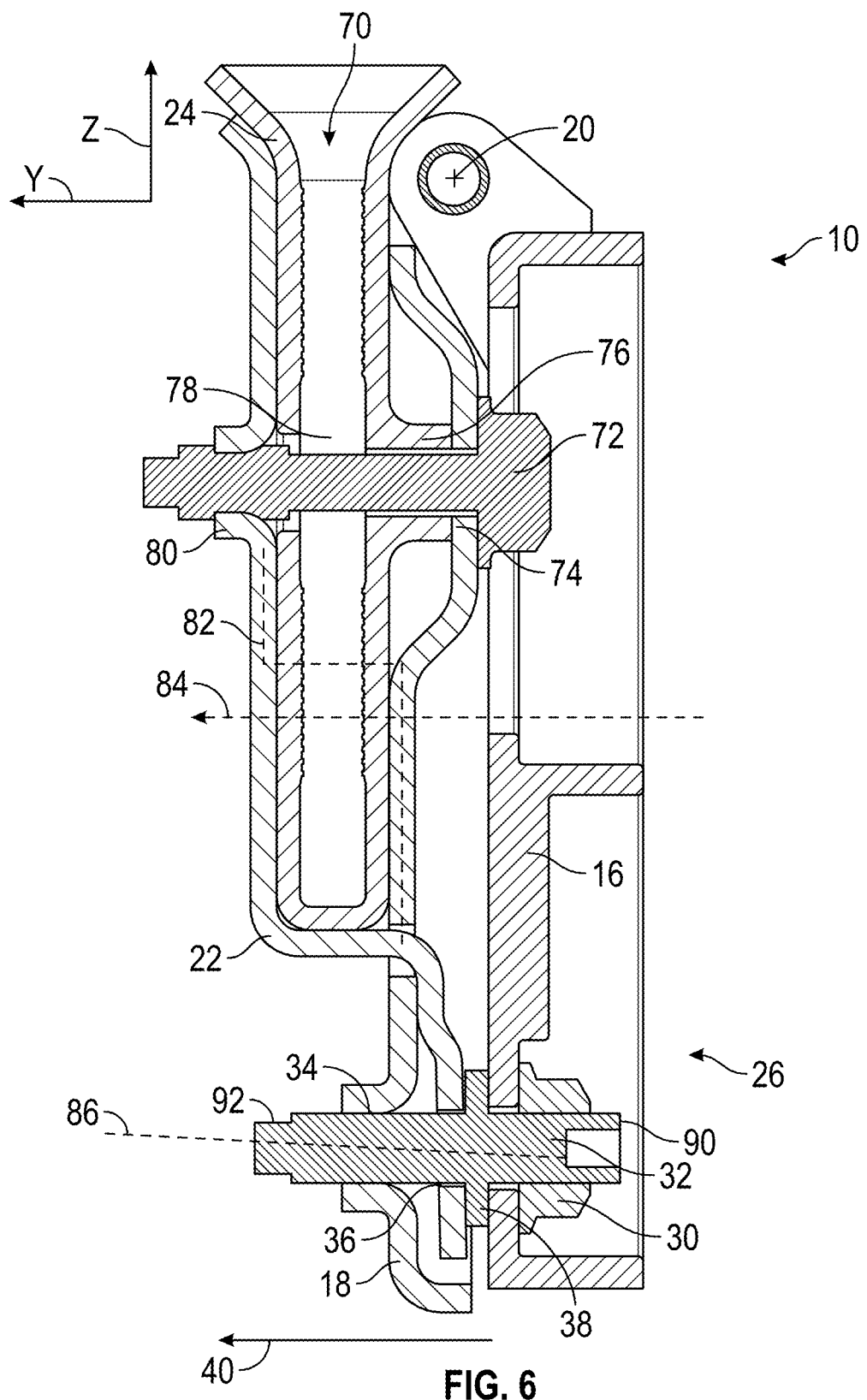
FIG. 6 is a cross-sectional side view of the pivoting cursor in accordance with the present disclosure.
Figure 7:
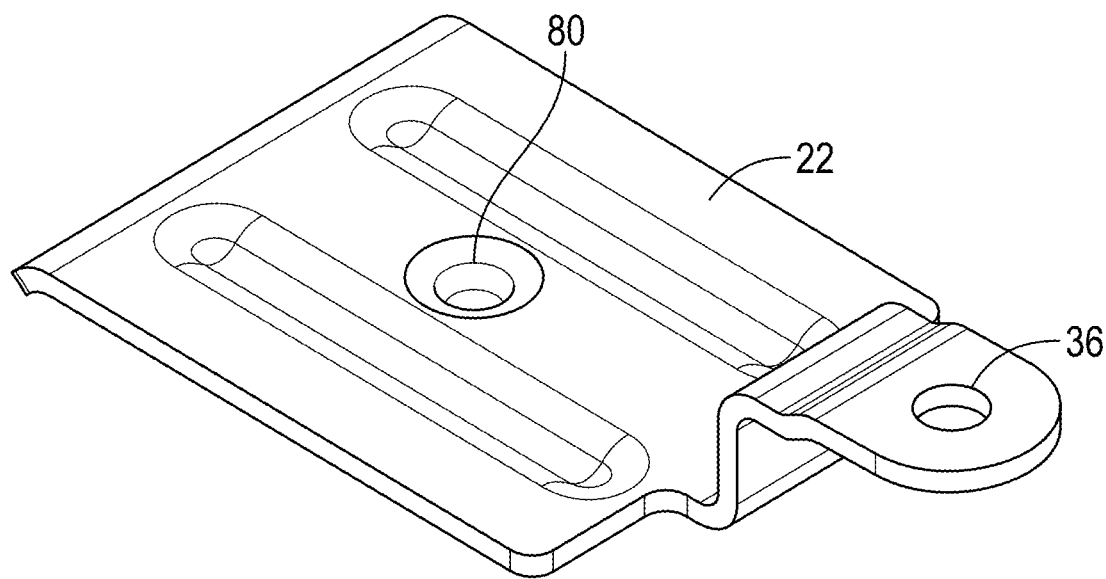
FIGS. 7 and 8 are perspective views of components of the pivoting cursor in accordance with the present disclosure.
Figure 8:
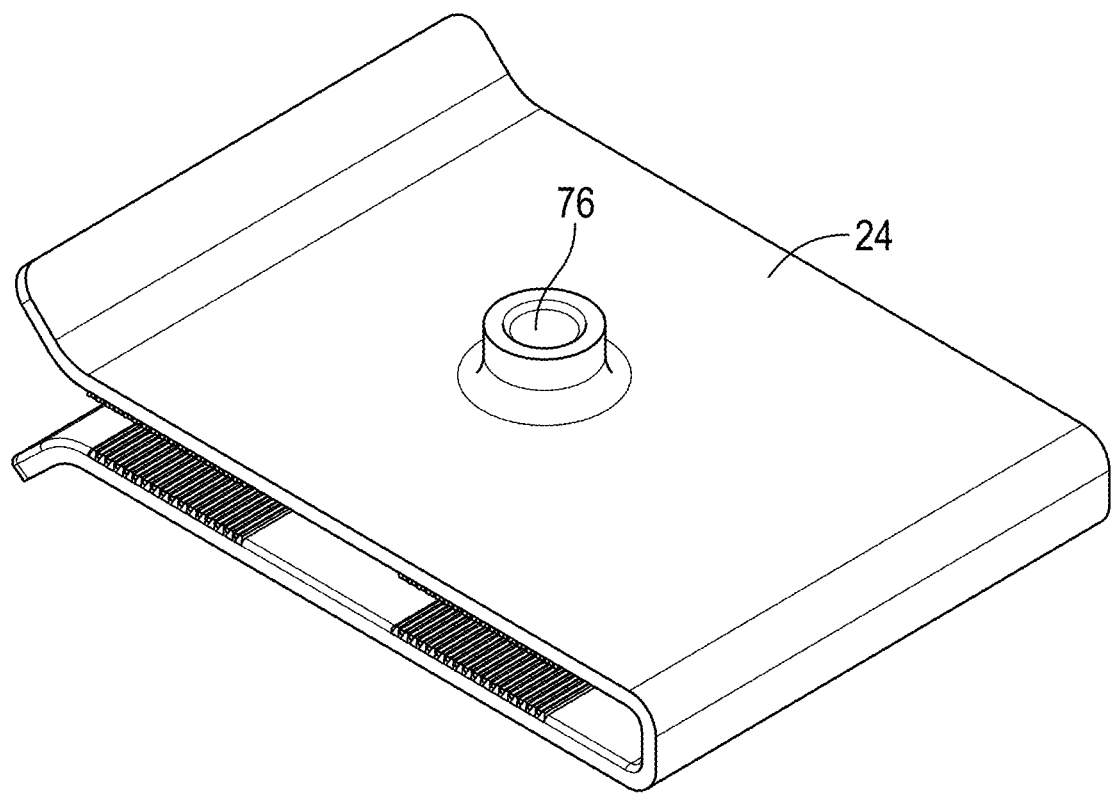

A detailed description of one or more embodiments of the disclosed apparatus and method are presented herein by way of exemplification and not limitation with reference to the Figures.

The present disclosure is directed to a cursor with four main elements: a die cast body which follows the rail curvature; a pivoting plate with a threaded adjuster; a clamping plate which has an extension leg to align and stabilize and also to ensure the clamping screw engaged the clamp squarely for screw alignment; and an isolator which is captured in the assembly by the clamp screw which is partially installed into the sub assembly for ease of assembly at the original equipment manufacturer (OEM).

Referring now to the FIGS. and in particular FIGS. 1-8, a pivoting cursor 10 for use with a window regulator 12 (FIGS. 9-15) of a vehicle door module 14 (FIGS. 9-15) is illustrated. The pivoting cursor 10 includes a main body portion 16, a pivoting plate 18 pivotally secured to the main body portion 16 for pivotal movement about an axis 20, a clamping plate 22, a seal 24, and a threaded adjuster 26 for pivoting the pivoting plate 18 with respect to the main body portion 16. In one embodiment, the pivoting plate 18 is rotationally mounted to a shaft, rod or elongated member 28 that is secured to the main body portion 16. In one embodiment, the threaded adjuster 26 comprises a nut or locknut 30 and a threaded rod, screw, threaded fastener, fastener or equivalents thereof 32, which in one embodiment may be a M6 screw. The threaded rod, screw, threaded fastener, fastener or equivalents thereof 32 threadingly engages the nut or locknut 30 as well as a threaded opening 34 of the pivoting plate 18. The threaded rod, screw, threaded fastener, fastener or equivalents thereof 32 does not threadingly engage an opening 36 the clamping plate 22. The threaded rod, screw, threaded fastener, fastener or equivalents thereof 32 may also have a flange portion 38 located between the main body portion 16 and the clamping plate 22.

Once the pivoting plate 18 is secured to the main body portion 16 via threaded rod, screw, threaded fastener, fastener or equivalents thereof 32 and nut or locknut 30 as illustrated in FIGS. 1-6. The threads of the nut 30 and the threaded opening 34 are configured such that further rotation of the threaded rod, screw, threaded fastener, fastener or equivalents thereof 32 will cause the pivoting plate 18 to pivot about axis 20 and cause the portion of the pivoting plate 18 secured to the threaded rod, screw, threaded fastener, fastener or equivalents thereof 32 to move in the direction of arrow 40 away from a portion of the main body portion 16 proximate to the threaded rod, screw, threaded fastener, fastener or equivalents thereof 32, which will also cause movement of the clamping plate 22, seal 24 and a window 42 such as a frameless window 42 that is received within seal 24, which is disposed between the clamping plate 22 and the pivoting plate 18. As mentioned above, the clamping plate 22 does not threadingly engage the threaded rod, screw, threaded fastener, fastener or equivalents thereof 32 so clamping plate 22 can slide along the threaded rod, screw, threaded fastener, fastener or equivalents thereof 32 as the threaded rod, screw, threaded fastener, fastener or equivalents thereof 32 is rotated to cause the pivotal movement of the pivoting plate 18.

Figure 9:
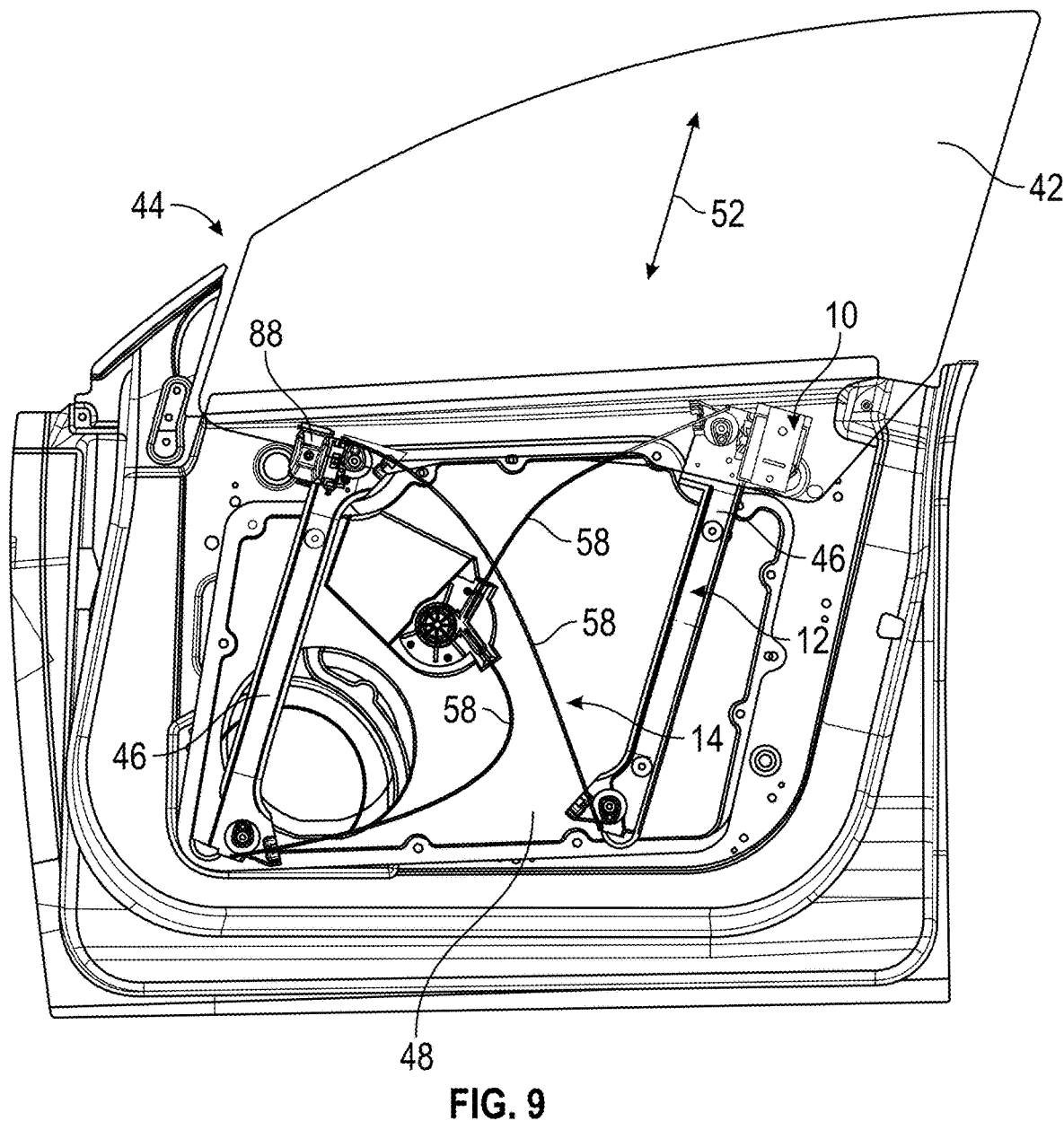
FIG. 9 is an outer view of a front door of a vehicle with a door module and a window regulator with a pivoting cursor in accordance with the present disclosure, wherein the door outer panel is removed in order to see the internal elements of the door.

Referring now to FIG. 9 an outer view (view from an outside of a vehicle with the outer panel removed) of a front door 44 of a vehicle with the door module 14 and the window regulator 12 with the pivoting cursor 10 in accordance with the present disclosure. The window regulator 12 includes a pair of guide rails 46 fixedly secured to an inner door panel 48 of the door module 14.

Referring back now to FIGS. 1 and 5, a pair of sliders 50 are secured to the main body portion 16 of the cursor 10. The pair of sliders 50 are configured to slidably engage one of the guide rails 46 the cursor 10 is slidably secured to. In one embodiment, the sliders 50 are formed a different material than that of the main body portion 16. The sliders 50 are formed from a material that is conducive to slidable engagement with the guide rails 46.

Figure 10:
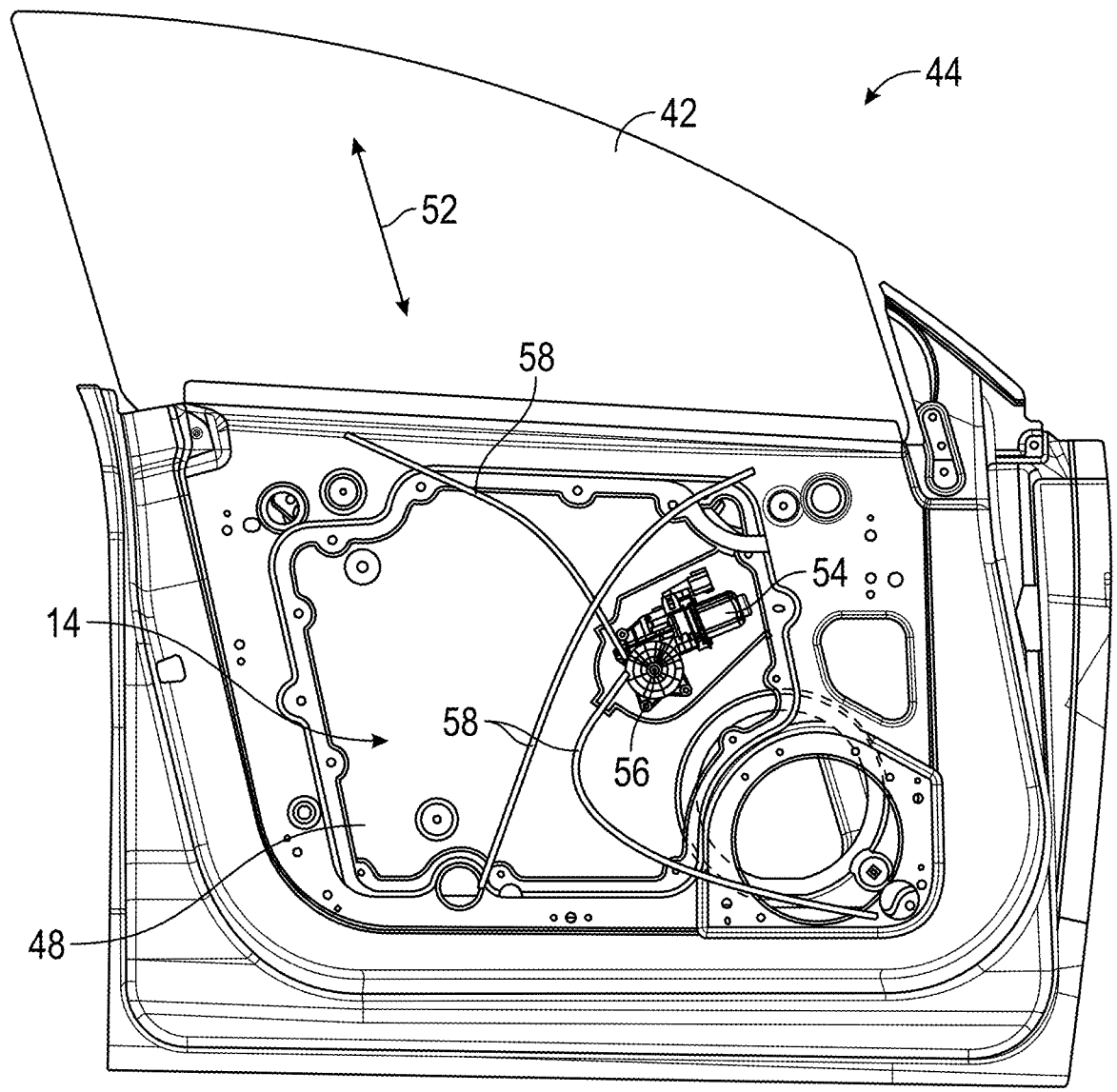
FIG. 10 is an inner view of the front door of FIG. 9, wherein the door trim is removed in order to see the internal elements of the door.
Figure 11:
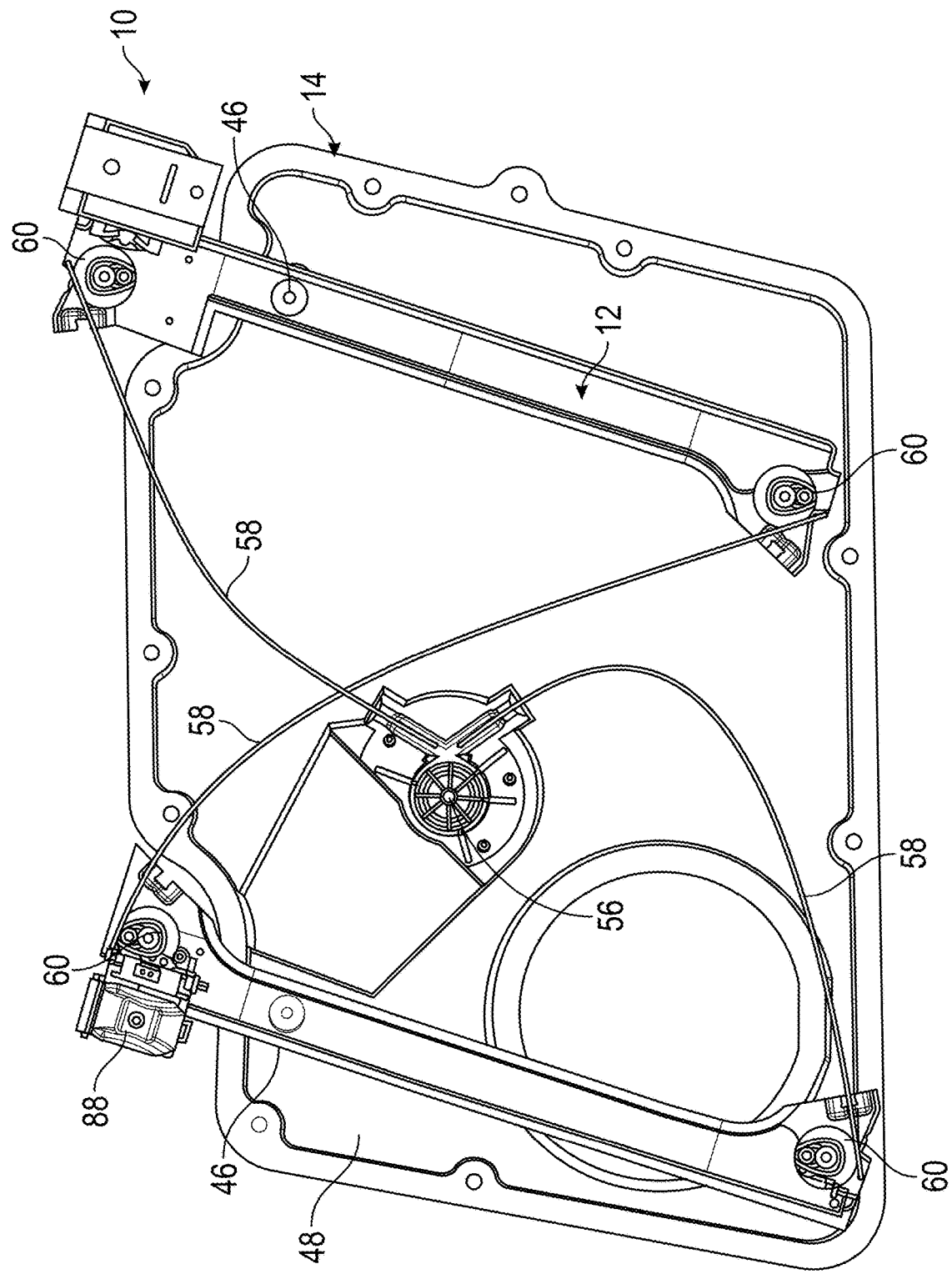
FIG. 11 is an outer view of the door module illustrated in FIG. 9.
Figure 12:
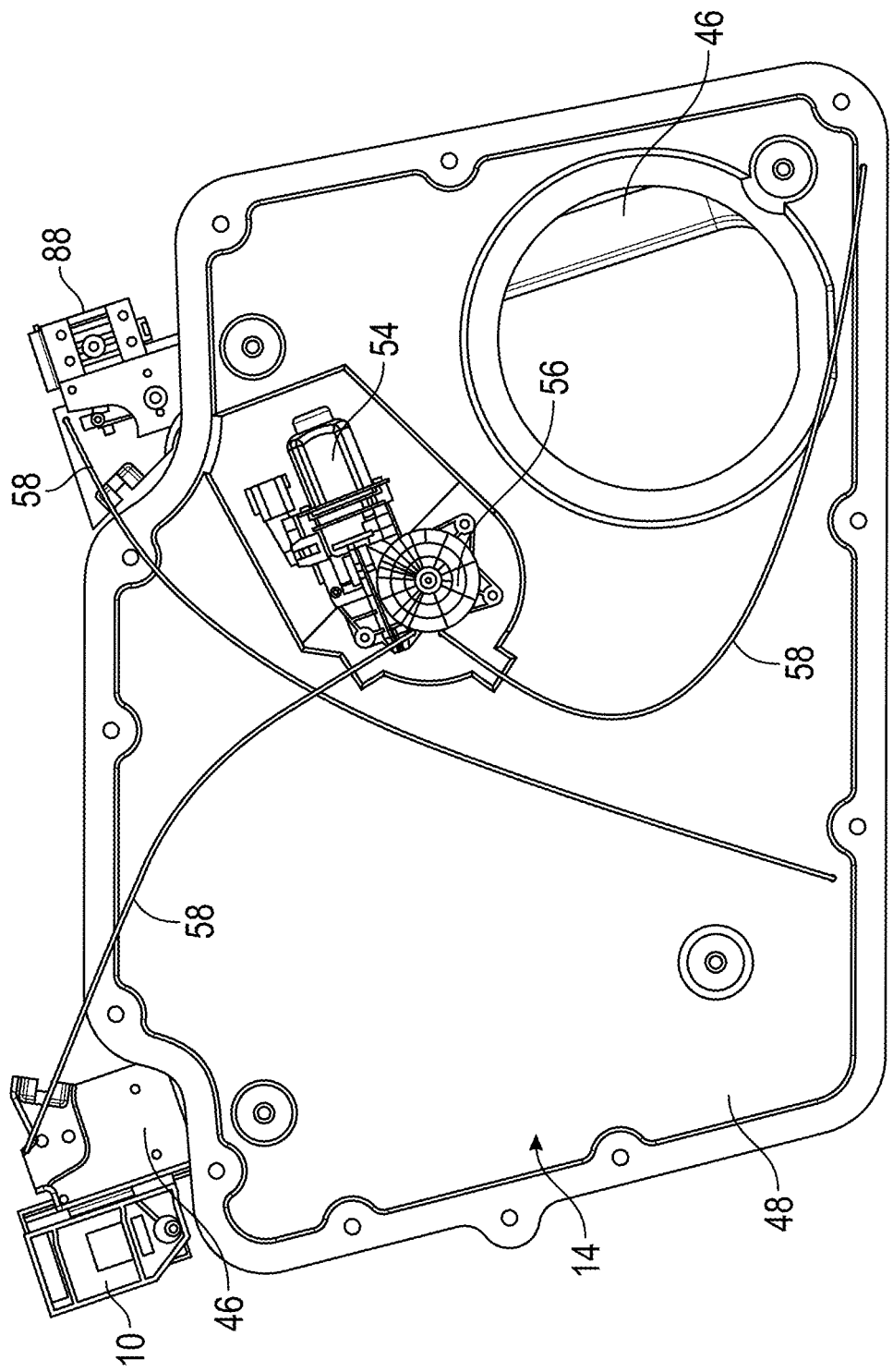
FIG. 12 is an inner view of the door module illustrated in FIG. 9.

FIG. 10 is an inner view of the front door 44 of FIG. 9. The outer view being opposite to the inner view. FIG. 11 is an outer view of the door module 14 illustrated in FIG. 9 while FIG. 12 is an inner view of the door module 14 illustrated in FIG. 9. In order to cause movement of the window or frameless window 42 up and down in the directions of arrows 52, a motor 54 is configured wind and unwind cables about a cable drum 56. The cables are secured to the cursor 10 at one end and the cable drum 56 at the other end. The cables will be slidably received in a cable sheath 58 and about pulleys 60 rotatably secured to the rails 46.

Figure 13:
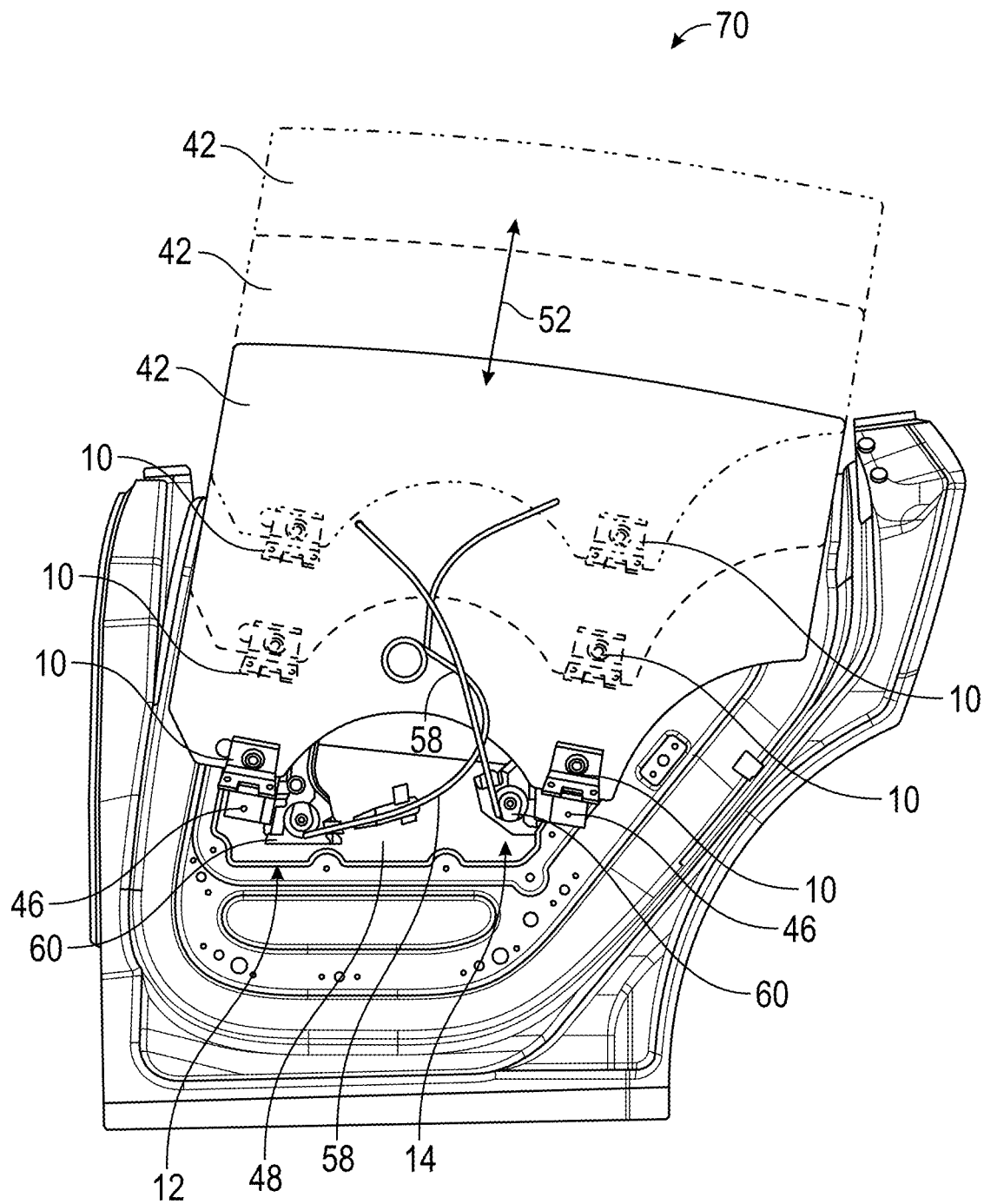
FIG. 13 is an outer view of a rear door of a vehicle with a door module and a window regulator with a pivoting cursor in accordance with the present disclosure.

FIG. 13 is an outer view of a rear door 70 of a vehicle with a door module 14 and a window regulator 12 with a pivoting cursor 10 in accordance with the present disclosure. FIG. 13 illustrates movement of the window or frameless window 42 in the direction of arrows 52. In FIG. 13 three positions of the window or frameless window 42 and the location of the cursors 10 for each position are illustrated.

Figure 14:
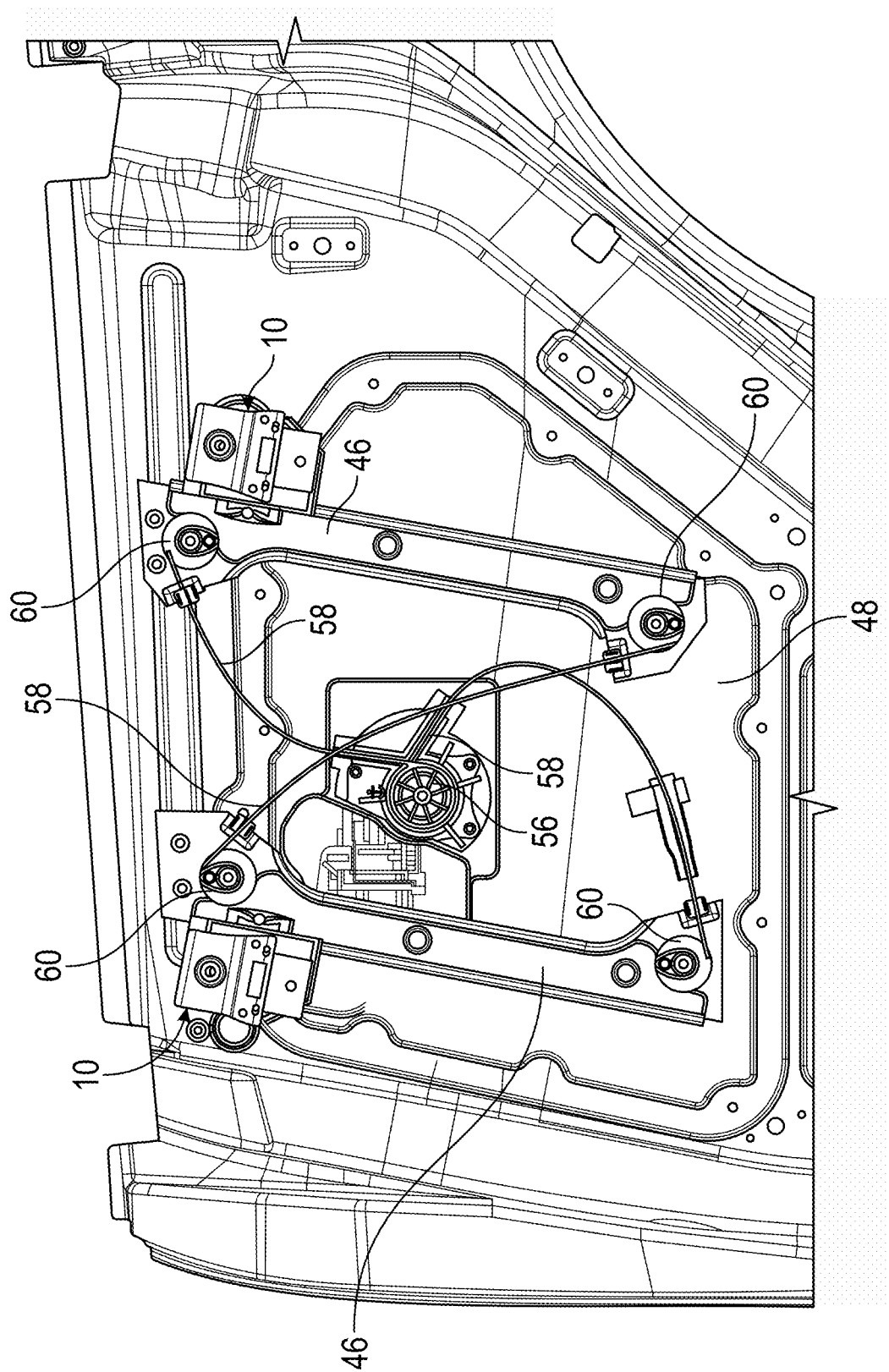
FIG. 14 is an outer view of the rear door of FIG. 13.
Figure 15:
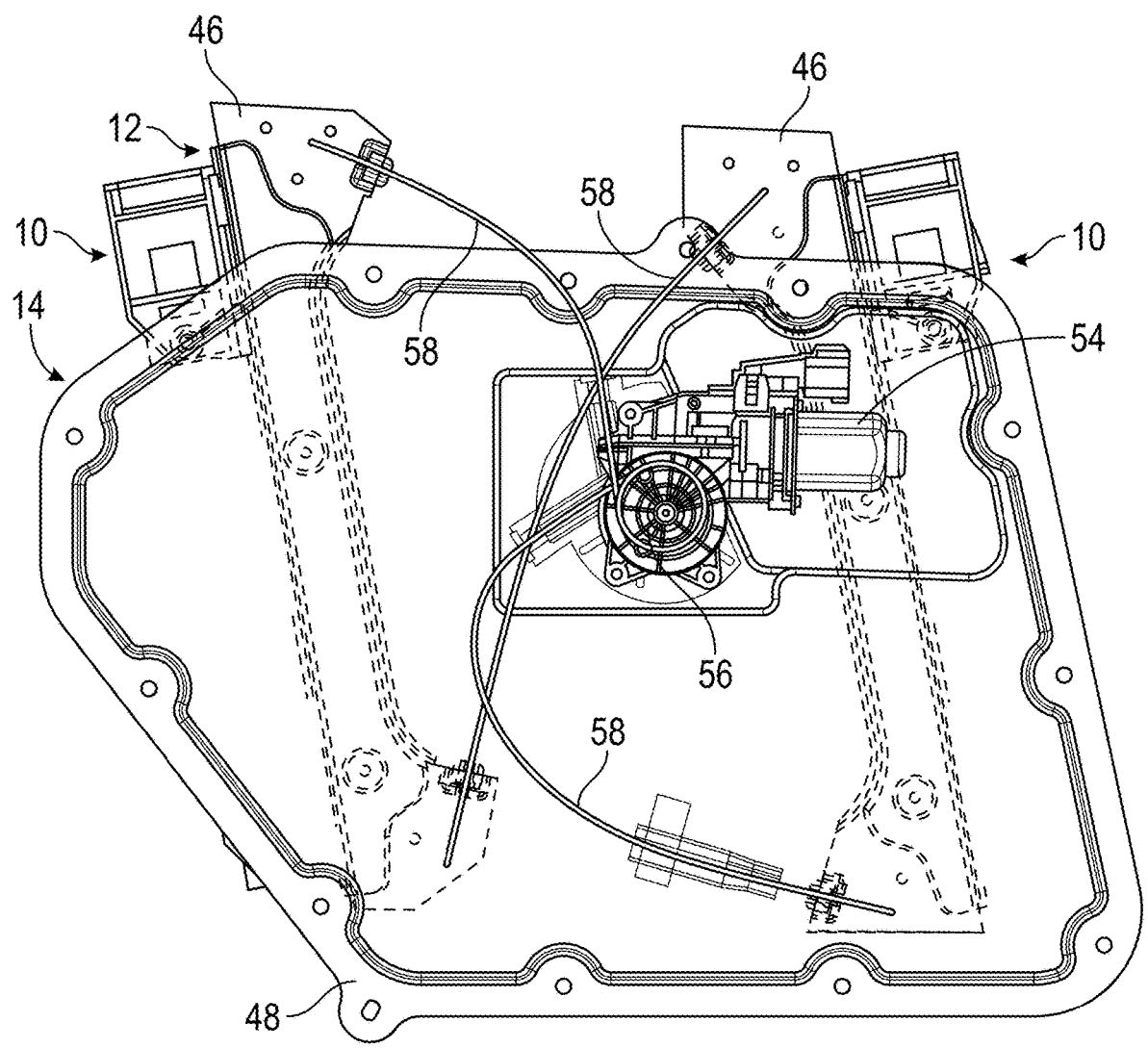
FIG. 15 is an inner view of the door module illustrated in FIG. 13.

FIG. 14 illustrates an outer view of the rear door of FIG. 13 without the window 42 and FIG. 15 is an inner view of the door module 14 illustrated in FIGS. 12 and 13.

In order to secure the window or frameless window 42 to the pivoting cursor 10, the window or frameless window 42 is inserted into a gap 70 of the seal 24. Thereafter, a screw, threaded fastener, fastener or equivalents thereof 72 is inserted through an opening of the main body portion 16, an opening 74 of the pivoting plate 18, openings 76 and 78 through the seal 24, an opening of the window or frameless window 42 and threadingly engages a threaded opening 80. As such, the screw threaded fastener, fastener or equivalents thereof 72 secures the window 42 to the pivoting cursor 10.

In an alternative embodiment, the clamping plate 22 is configured to have the shape as illustrated by the dashed line 82 such that the screw, threaded fastener, fastener or equivalents thereof 72 can pass through in the direction of arrow 84, which would be underneath seal 24 and window 42 in this embodiment. As such, there is no need for an opening (a drilled hole) in the window 42 for the screw, threaded fastener, fastener or equivalents thereof 72 to pass through this embodiment. Thus, the window 42 in this embodiment may be easier to manufacture thereby reducing the cost of the window 42.

Once the window 42 is secured to the pivoting cursor 10 as described above, the pivoting plate 18 is adjusted by rotating the threaded rod, screw, threaded fastener, fastener or equivalents thereof 32 in order to adjust the window 42 in the direction of arrow 40 as well as a direction opposite to arrow 40. It should be also noted that since the length of the pivoting plate 18 is fixed from the axis of rotation 20 movement of the pivoting plate 18 in the direction of arrow 40 may cause a slight deflection in an axis of rotation 86 of the threaded rod, screw, threaded fastener, fastener or equivalents thereof 32 in the direction illustrated by the dashed lines. Prior to the pivoting of the pivoting plate 18 about axis of rotation 86 of the threaded rod, screw, threaded fastener, fastener or equivalents thereof 32 is perpendicular to the axis of rotation 20.

The door module 14 used for the front door 44 only uses the pivoting cursor 10 for the rear portion of the window 42 while a separate non-pivoting cursor 88 is used for the forward portion of the window 42. The pivoting cursor 10 and the non-pivoting cursor 88 are each slidably received on a respective one of the guide rails 46. In contrast, the door module 14 used for the rear door 70 employs the pivoting cursor 10 for both the forward portion of the window 42 and the rear portion of the window 42, each being slidably secured to a respective one of the guide rails 46.

During installation of the glass 42, the glass 42 is dropped into the pre-assembled cursor clamps (e.g., pivoting cursor 10 and cursor 88) for the front door 44 and pivoting cursors 10 for the rear door 70. Once the glass is inserted into the cursors X and Z adjustment accommodated by clamping to glass 42 to the cursors using screw, threaded fastener, fastener or equivalents thereof 72 and Y adjustment achieved by pivoting the cursor 10 through rotation of threaded rod, screw, threaded fastener, fastener or equivalents thereof 32.

The pivoting cursors 10 are adjustable from an inboard side of the vehicle with or without the door closed. The threaded rod, screw, threaded fastener, fastener or equivalents thereof 32 may be rotated at either end 90, 92 of the threaded rod, screw, threaded fastener, fastener or equivalents thereof 32. They can be trend set at an assembly station and may be adjusted either in the doors off fixture or in the vehicle build as needed. Once the adjustment corresponding to the precise and actual geometry of the vehicle which variates due to construction tolerances, the threaded rod, screw, threaded fastener, fastener or equivalents thereof 32 is held in position by a first tool at either end 90, 92 while locknut 30 is tightened with a second tool such that in cooperation with flange portion 38 the main body portion 16 is sandwiched and any further rotation of the threaded rod, screw, threaded fastener, fastener or equivalents thereof 32 is prevented.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pivoting cursor for a frameless window of a vehicle door, comprising:
   a main body portion;
   a pivoting plate pivotally secured to the main body portion for pivotal movement about an axis;
   a clamping plate, the clamping plate passing through an opening in the pivoting plate such that a portion of the clamping plate is located between the pivoting plate and the main body portion;
   a seal; and
   a threaded adjuster for pivoting the pivoting plate with respect to the main body portion and wherein the portion of the clamping plate located between the pivoting plate and the main body portion slidably receives the threaded adjuster.

2. The pivoting cursor as in claim 1, wherein the pivoting plate is rotationally mounted to a shaft that is secured to the main body portion.

3. The pivoting cursor as in claim 1, wherein the threaded adjuster comprises a nut and a threaded fastener.

4. The pivoting cursor as in claim 3, wherein the threaded fastener threadingly engages the nut and a threaded opening of the pivoting plate.

5. The pivoting cursor as in claim 4, wherein the threaded fastener does not threadingly engage an opening in the clamping plate.

6. The pivoting cursor as in claim 4, wherein threads of the nut and the threaded opening are configured such that rotation of the threaded fastener therein will cause the pivoting plate to pivot about the axis and cause a portion of the pivoting plate secured to the threaded fastener to move in a direction away from a portion of the main body portion proximate to the threaded fastener, which will also cause movement of the clamping plate, the seal and a window that is received within the seal.

7. The pivoting cursor as in claim 3, wherein the threaded fastener includes a flange portion located between the main body portion and the clamping plate.

8. The pivoting cursor as in claim 1, further comprising a pair of sliders secured to the main body portion.

9. The pivoting cursor as in claim 8, wherein the pair of sliders are formed a different material than that of the main body portion.

10. A door module, comprising:
a window regulator secured to an inner door panel of the door module, the window regulator including a pair of guide rails fixedly secured to the inner door panel of the door module; and
a pivoting cursor for slidably engaging one of the pair of guide rails, the pivoting cursor comprising: a main body portion; a pivoting plate pivotally secured to the main body portion for pivotal movement about an axis; a clamping plate, the clamping plate passing through an opening in the pivoting plate such that a portion of the clamping plate is located between the pivoting plate and the main body portion; a seal; and a threaded adjuster for pivoting the pivoting plate with respect to the main body portion and wherein the portion of the clamping plate located between the pivoting plate and the main body portion slidably receives the threaded adjuster.

11. The door module as in claim 10, wherein the pivoting plate is rotationally mounted to a shaft that is secured to the main body portion.

12. The door module as in claim 10, wherein the threaded adjuster comprises a nut and a threaded fastener.

13. The door module as in claim 12, wherein the threaded fastener threadingly engages the nut and a threaded opening of the pivoting plate.

14. The door module as in claim 13, wherein the threaded fastener does not threadingly engage an opening in the clamping plate.

15. The door module as in claim 12, wherein the door module is a rear door module and a frameless window is secured to the pivoting cursor.

16. The door module as in claim 15, wherein the pivoting cursor is a pair of pivoting cursors each one of the pair of pivoting cursors being slidably secured to a respective one of the pair of guide rails.

17. The door module as in claim 16, wherein threads of the nut and the threaded opening are configured such that rotation of the threaded fastener therein will cause the pivoting plate to pivot about the axis and cause a portion of the pivoting plate secured to the threaded fastener to move in a direction away from a portion of the main body portion proximate to the threaded fastener, which will also cause movement of the clamping plate, the seal and the frameless window that is received within seal.

18. The door module as in claim 10, wherein the pivoting cursor further comprises a pair of sliders secured to the main body portion, the pair of sliders being configured to slidably engage one of the pair of guide rails.

19. The door module as in claim 10, wherein the door module is a front door module and a frameless window is secured to the pivoting cursor.

20. A method of mounting a frameless window of a vehicle to a door module, comprising:
securing a portion of the frameless window to a pivoting cursor slidably engaging one of a pair of guide rails of a window regulator secured to the door module; and
adjusting a location of the frameless window by pivoting a pivoting plate of the pivoting cursor with respect to a main body portion of the pivoting cursor, the pivoting cursor further comprising a clamping plate passing through an opening in the pivoting plate such that a portion of the clamping plate is located between the pivoting plate and the main body portion and a threaded adjuster for pivoting the pivoting plate with respect to the main body portion, wherein the portion of the clamping plate located between the pivoting plate and the main body portion slidably receives the threaded adjuster.

* * * * *